United States Patent [19]

Non

[11] 4,099,743
[45] Jul. 11, 1978

[54] PASSIVE RESTRAINT SYSTEM WITH HEAD AND KNEE RESTRAINT

[76] Inventor: Tse Quong Non, 2315 S. Wentworth Ave., Chicago, Ill. 60616

[21] Appl. No.: 767,475

[22] Filed: Feb. 10, 1977

[51] Int. Cl.$^2$ .......................................... B60 R 21/02
[52] U.S. Cl. .................................................... 280/753
[58] Field of Search ...................... 280/745, 749, 753; 299/390

[56] References Cited

U.S. PATENT DOCUMENTS

| | | | |
|---|---|---|---|
| 3,392,989 | 7/1968 | Grahm | 280/753 |
| 3,633,936 | 1/1972 | Huber | 280/749 |
| 3,804,430 | 4/1974 | Fiala | 280/749 |
| 4,023,643 | 5/1977 | Bagley | 280/753 |

*Primary Examiner*—Robert R. Song

*Attorney, Agent, or Firm*—Fitch, Even, Tabin & Luedeka

[57] ABSTRACT

A passive restraint system is provided with a head restraint which is shiftable along with a torso restraint from a stowed position to an operative position for limiting movement of the head and neck at the time of an accident. The preferred head restraint element is an energy absorbing cushion or pillow-like member which is shifted from its stowed position beneath the dashboard of the vehicle by a cable means to the operative position at which it engages the chin of the vehicle occupant. Preferably, a pivotally mounted knee restraint element is likewise shifted to an operative position against the knees of the vehicle occupant to limit the forward and downward movement of the occupant relative to the seat. Each of the restraint elements is returned by retracting it to a stowed position and is available for reuse.

6 Claims, 7 Drawing Figures

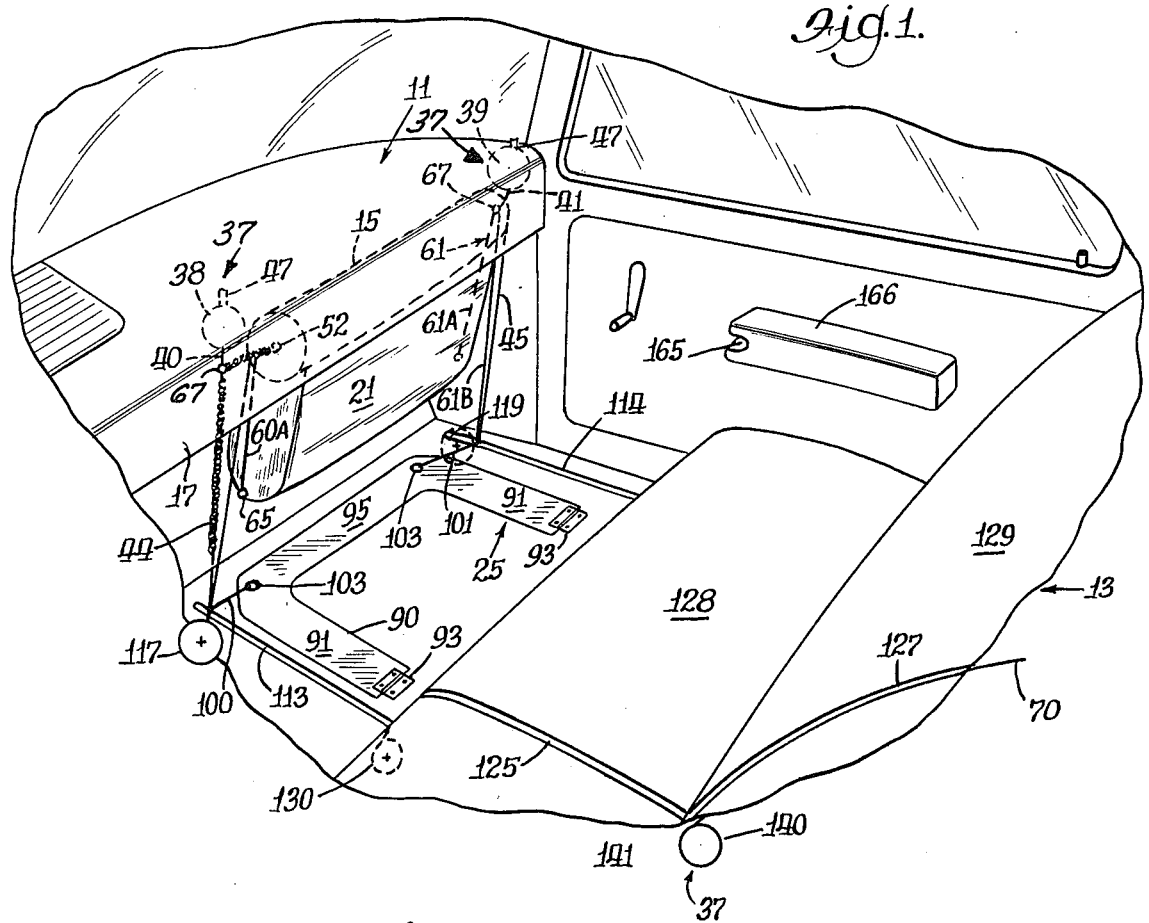
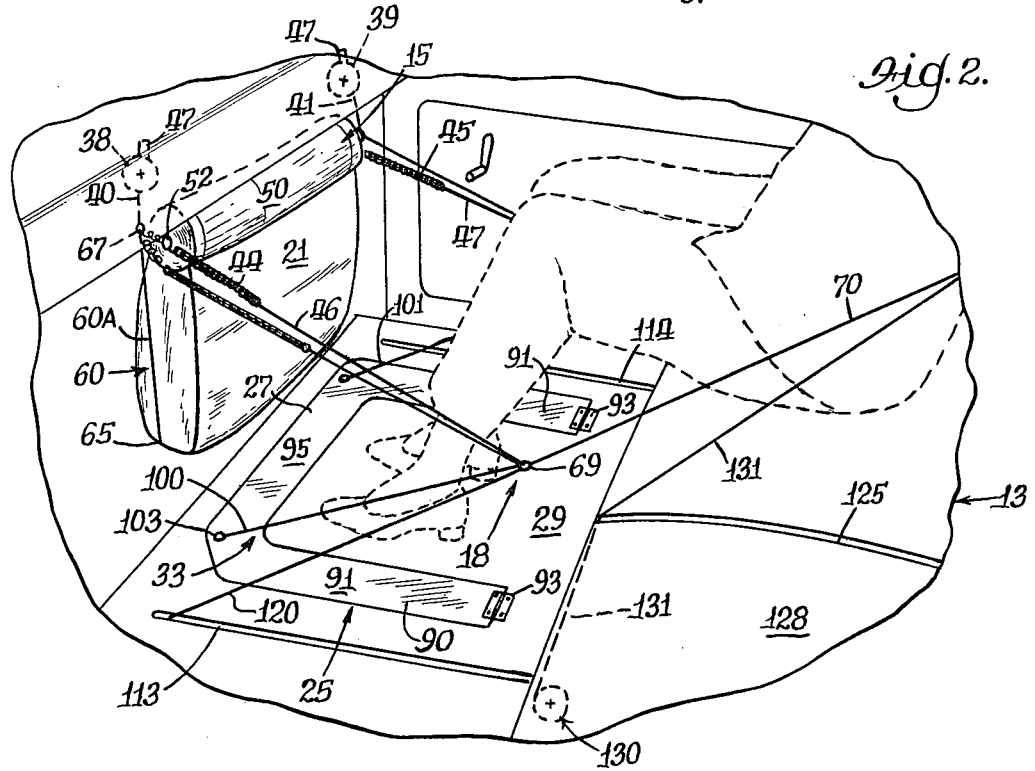

PASSIVE RESTRAINT SYSTEM WITH HEAD AND KNEE RESTRAINT

This invention relates to a safety restraint system for motor vehicles and more particularly to a passive restraint safety system in which the restraining elements are moved automatically from a stowed position to a restraining position at the time of sudden deceleration or acceleration of the vehicle.

The present invention is directed to an improvement in the passive restraint system such as shown in U.S. Pat. No. 3,940,146. As disclosed more fully in the aforesaid patent, a safety restraint element in the form of one or more belts are connected to hidden cables which are retracted to hold the belt in a stowed position at or about the dashboard of the vehicle. An inertia means or means sensing very high braking pressure by the driver operates a means to pull the cables to shift the restraining elements to restraint positions engaging the torso of the seat occupants to hold them against forward movement during impact. In one embodiment disclosed in the aforesaid patent a lower restraint element engages the seat occupants at along or about their hips while a second restraint element engages the occupants about their chests. It has been recognized that in addition to the restraining of the torso of the occupant that the occupant's head and neck should also be restrained to limit excessive forces being applied to hyperextend the neck or to prevent the rebound of the head as will again injure the neck. While it has generally been recognized that such devices for head and neck restraints are desirable, there has been lacking in a suitable head restraint which operates effectively in a passive restraint system.

While the air bag system provides some head restraint, it suffers from other problems, in particular the richochet problem in that it is only operable for a first impact whereas the car experiences a second and later impact and the air bag is no longer effective. More specifically an automobile may hit a glancing blow to a first vehicle causing the air bag to become effective and then prior to the second and more serious impact with another vehicle or a stationary obstacle finding that the air bag is no longer effective. Moreover, an air bag is usable only once so that after it has been expended, it is unsafe to drive the vehicle until a new air bag has been installed. Assuming the vehicle is drivable after an accident, the driver will be unprotected until a new air bag is installed. The time and cost to re-install and replace the air bag are considerable. Moreover, the air bag by itself will not provide restraint against lateral collisions against one of the doors of the vehicle.

Another problem with some of the belt systems in use is that of submarining of the belted occupant in which the occupant slides along the seat underneath the belt during a major deceleration of the vehicle. Some manufacturers have installed a stationary knee bar underneath the dashboard of the vehicle adjacent to the occupant's knees for impact should the occupant begin to submarine underneath the seat belts. Such a stationary system must, of course, take up considerable space and must be spaced considerably away from the knees of people with short legs if there is to be room for people with long legs to be seated in the same vehicle. Moreover, such knee bars make ingress and egress of the vehicle more difficult.

Accordingly the general objective of the invention is to provide a new and improved passive restraint system, as contrasted with prior art passive restraint systems, having a head restraint. Another object in the invention is to provide a passive restraint system with both a head and knee restraint.

Other objectives and advantages of the invention will become apparent from the detailed description taken in connection with the accompanying drawings in which:

FIG. 1 is a diagrammatic view of the safety belt system mounted on a vehicle in the stowed position and emboding the novel features of the invention;

FIG. 2 is a view similar to FIG. 1 but with the safety belt system beginning to shift from the stowed position to the restraining position;

Figure 5:
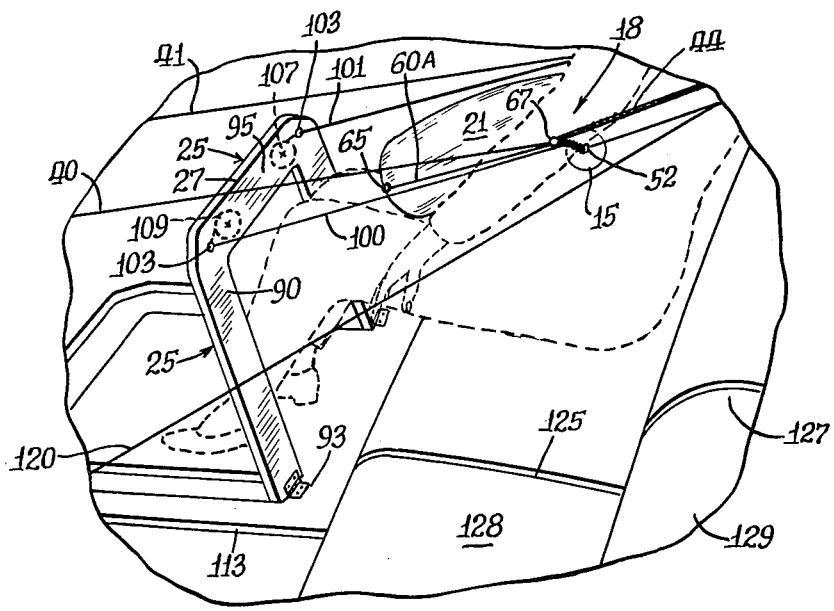
FIG. 5 illustrates the knee restraint and torso restraint elements being positioned at their restraining positions.
Figure 7:
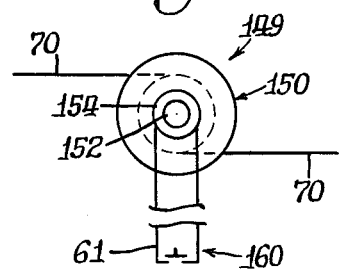
FIG. 7 is a fragmentary, diagrammatic view of a take-up reel for the cables.
Figure 6:
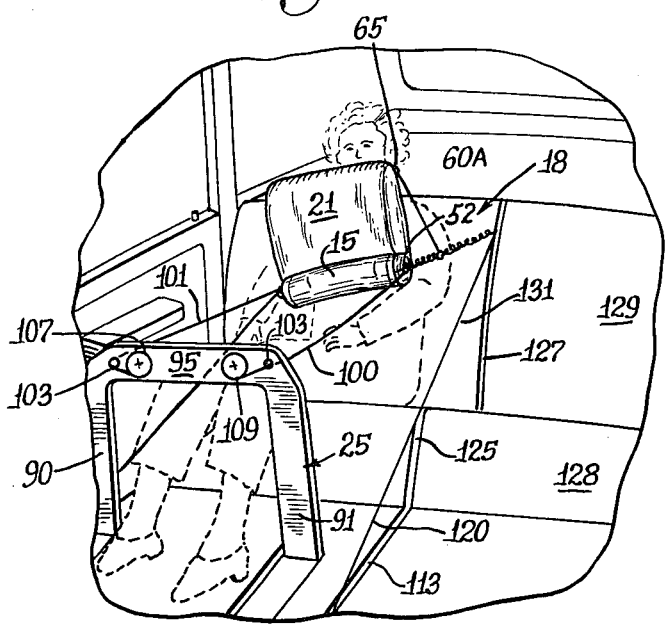
FIG. 6 illustrates the head restraint, torso restraint and knee restraint in their restraining positions.

As shown in the drawings for purposes of illustration, the invention is embodied in a passive restraint system 11 for use in a vehicle such as an automobile having a seat 13 upon which are seated one or more occupants. In the illustrated embodiment of the invention an occupant is shown in FIG. 2–6 as seated in the passenger side of the front seat, it being understood that a similar and duplicate restraining system may be provided for the driver. The preferred torso restraining system 11 includes a torso restraint element 15 which is adapted to be shifted from a stowage position underneath the dashboard 17 of a vehicle (FIG. 1) to the restraining position shown, such as shown in FIG. 6, in which the restraining element is positioned against the knees of the occupant and securely held by means such as cable means 18. The preferred torso restraint element is that shown in U.S. Pat. No. 3,940,164, a disclosure of which is hereby fully incorporated by reference as if fully reproduced herein.

While the torso restraint system disclosed in the aforementioned patent is generally satisfactory and is particularly desirable in that it is in an obscure stowage position allowing free ingress or egress from the vehicle, the torso restraint element is not as effective to prevent the snapping or hyperextension of the neck at the time of an accident. It is known that the weight of the head is sufficient at the time of an accident to continue to exert force on the neck and to pivot about the neck to cause damage to the neck when the body is restrained by a belt system but the head is free to move unrestrained. While the three-point belt systems are generally satisfactory to prevent submaring or sliding of the occupant from the vehicle seat 13 underneath the seat belts toward the dashboard 17 of the vehicle, there has been proposed and installed in some vehicles a knee bar which is a stationary element positioned in front of the knees and underneath the dashboard 17. Such a restraint element, of course, limits the freedom of leg movement both when in a sitting position and also at the time of getting into or out of the car.

In accordance with the present invention, there is provided a head restraint 21 which is shiftable from a stowed position, such as shown in FIG. 1, underneath the dashboard 17 to the restraint position, such as shown in FIG. 6, in which the head restraint element 21 is positioned before the occupant's head to absorb and cushion energy from the head at the time of impact. The preferred restraint element 21 is in the form of an energy absorbing, soft cushion member into which the occupant's face may impact without damaging the face while absorbing energy to prevent rebound of the head as well as hyperextension of the neck. The preferred and illustrated head restraint element 21 is in the form of a pillow having air or other compressible fluid therein which may be bled therefrom through a suitable orifice at the time of impact by the head. Alternatively, the pillow may be of a plastic or rubber form of sufficient resiliency to absorb the energy without exerting a large amount of rebound force to the head.

Also in accordance with the further aspect of the invention, the safety belt system includes a knee restraint element 25 which is shiftable with a torso restraint element 15 and the head restraint element 21 from a stowed position, such as shown in FIG. 1, to a restraining position against the knees of the occupant, as shown in FIG. 6. The preferred knee restraint element includes a horizontal bar 27 which may be suitably cushioned or padded and which is pivotally mounted to swing upwardly from a position generally horizontal and planar with the floorboard 29 of the vehicle to the generally upright restraining position shown in FIG. 6.

In accordance with the further and important aspect of the invention, both the head restraint 21 and the knee restraint 25 are readily shifted with the torso restraint 15 by a suitable power means such as disclosed in the aforementioned patent to shift the cable means which also includes head restraint cable means 31 and knee restraint cable means 33 operating generally in the manner of the cable means disclosed in the aforementioned patent. More specifically, it is preferred that the neck restraint element and the knee restraint element 25 each be connected to a return means 37 which retracts the head restraint element, the torso restraint element and knee restraint element from their operative positions after usage and returns them to their stowed positions. These restraint elements are intended to be used more than once without replacement and are ready for reuse without costly repairs after they have been used initially.

Referring now in greater detail to the preferred embodiment of the invention illustrated herein, the head restraint 21 may take various shapes and forms but herein is in the form of a rectangularly shaped pillow which is stowed generally upright beneath the dashboard 17 at a stowed position with the upper portion of the pillow being generally hidden and the lower portion being exposed and located forwardly of the knees of the seated occupant. The illustrated pillow 21 is an inflated pillow having a hollow plastic casing. The preferred pillow is an energy absorbing, resilient member which the occupant's face abuts to deform and slow the movement of the occupant's head. This slowing of the forward movement of the head and the energy absorbed during deformation of the pillow limits movement of the head relative to the torso.

Figure 3:
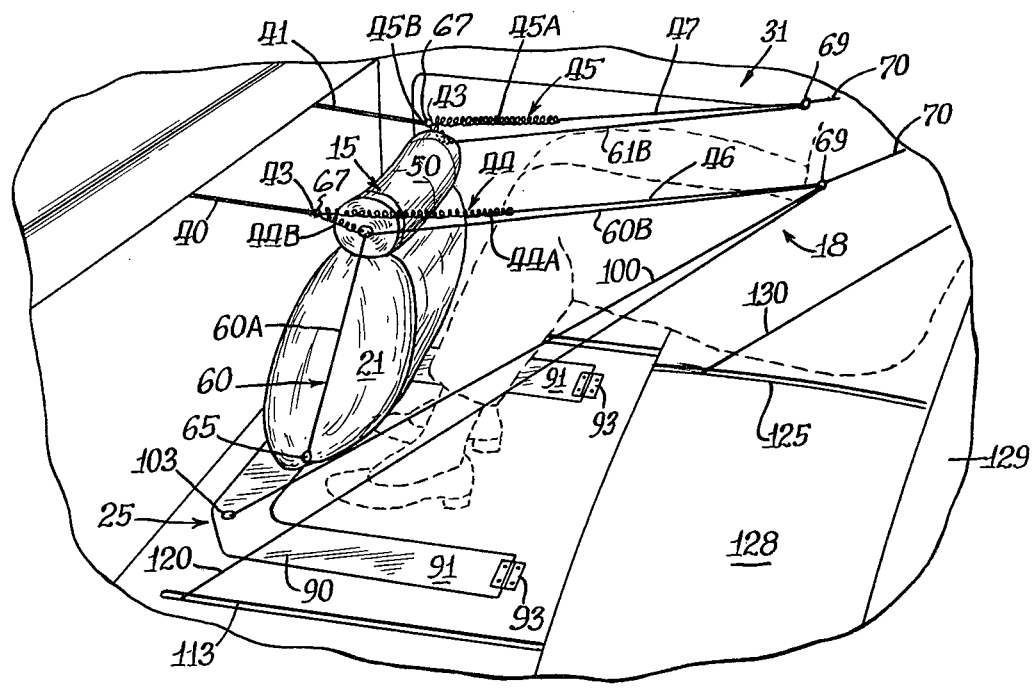
FIG. 3 and FIG. 4 are views similar to FIG. 2 showing the further shifting of the torso restraining element, head restraining element and knee restraining element.

As best seen in FIGS. 2 and 3, the lower edge of the torso element restraint system 15, which is preferably in the form of a cylindrical cushion member, is connected to the upper longitudinal edge of the pillow so that the head restraint element and the torso restraint element move together as a unit. Although it is not necessary that the head restraint and torso restraint be connected, the preferred connection therebetween and their connection to the cable means 31 is such that the head restraint is pivoted upwardly and into the face of the occupant at the time of impact with a definite force to provide a better cushioning effect and restraint for the head. This pivoting action is illustrated in FIGS. 5 and 6 and will be discussed hereinafter in greater detail.

Figure 4:
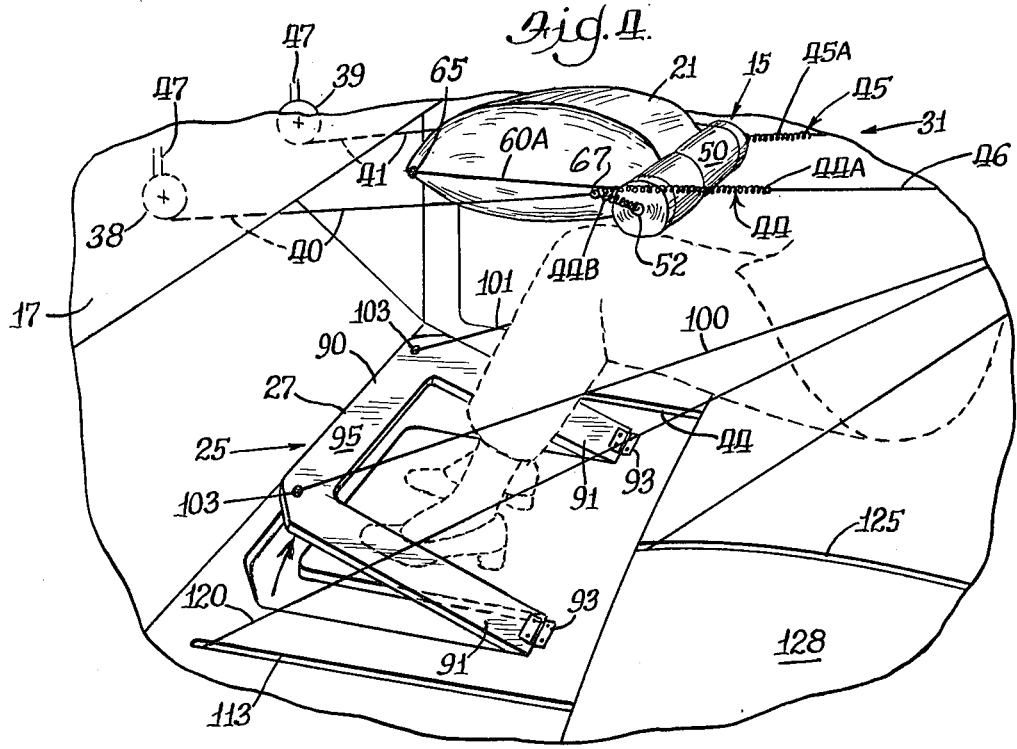

Both the torso restraint element 15 and head restraint element 21 may be returned to the stowed position beneath the dashboard 17 by the return means 37 which includes a pair of retractors 38 and 39 (FIGS. 1 and 2) which are in the form of reels having wound thereabout return cables or cords 40 and 41, as best seen in FIGS. 3 and 4, which are connected at inner ends 43 to heavy support cables 44 and 45 for the head restraint and torso restraint elements. As fully explained in the aforementioned U.S. Pat. No. 3,940,164, such retractors have a return spring which turns the reels to rewind the long cables 40 and 41 thereon after termination of the accident. Herein, the retractors 38 and 39 are suitably fastened by means 47 to the vehicle. The preferred retractor means 38 and 39 are mounted in a stationary manner at a location upwardly and inwardly of the dashboard 17, as best understood from FIGS. 2 and 4.

The torso restraint 15 may take many forms but is preferably in the form of a generally, padded cylinder 50 having a central axle or hub means 52 about which the outer portion of cylinder 50 may turn. The head restraint 21 also pivots about the axis of the axle means 52 as the pillow pivots upwardly to a position above the torso restraint 15 as shown in FIG. 6. The turning movement of the generally cylindrical torso restraint 21 also facilitates its movement over the knees of the occupant and along his legs to a position at his torso. The torso restraint 15 is preferably made with a resilient foam outer cushion so as not to injure the passenger at the time of restraint of the torso. The torso restraint may be in various shapes and forms including belts or webbings or inflatable members and still fall within the purview of this invention.

The preferred cable means has a series of lightweight cables or cords connected to a series of retractors, as will be explained hereinafter; and, these lightweight cables or cords may be nylon filament cords of about .177# tensile strength and about ⅛ inch or less in diameter. Such nylon cords wind easily on the retractors and lie readily in grooves to remain hidden when tensioned. The heavy support cables 44 and 45 are preferably made from a larger diameter nylon cord or rope. Preferably, a single piece heavy strength nylon cord extends through the body restraint element 15 and opposite ends of this single piece cord are the cables 44 and 45 which bear the restraining load. The body restraint element 15 thus turns about this nylon cord.

As will be explained in greater detail hereinafter, the cable means 18 includes several light, fine cables of cord or plastic such as the retracting wires 40 and 41 connected to retractors and heavier and stronger cables 44 and 45 which are adapted to be wound about the takeup reel and hence provide the necessary strength to withstand the forces applied thereto by the torso restraint element 15 and head restraint element 21 by the occupant's body at the time of a collision. Herein, these strong cables 44 and 45 are relatively short in length and first sections or portions 44A and 45A connected to the axle means 52 and other sections 44B and 45B connected to lighter cords 46 and 47 which do not take the heavy load but merely serve to pull these cable sections 46 and 47 onto the winding reel.

The portion of the cable means 18 which generally pivots the pillow 21 about the torso restraint 15 includes a pair of small cords or cables 60 and 61 disposed at opposite ends of the pillows with respective sections 60A and 61A thereof connected at the lower ends 65 to the lower end of the pillow. Each of the sections 60A and 61A extend along the pillow, as best seen in FIG. 3, for sliding movement through a circular guide loop 67 attached to the heavy duty cable 44 and 45 at locations closely adjacent opposite ends of the axle means 52 of the torso restraint 15. The head restraint pivoting wires 60 and 61 further include sections 60B and 61B extending, as best seen in FIG. 3, from the guide loops 67 to a common attaching eye 69 which is connected to cords 70 extending to and wrapped about the main take and drive reel. Initially, when the head restraint pillow 21 is in the stowed position, as shown in FIG. 1, the sections 60A and 61A of the wires 60 and 61 extend generally downwardly from their respective guide loops 67 to ends 65 fastened to the head restraint pillow. However, as the pillow and torso restraint passes about the knees of the occupant, as best seen in FIG. 4, these sections 60A and 61A take a generally horizontal position as shown in FIG. 4. When the torso restraint 15 hits the body, as best seen in FIG. 5, and sections 60A and 61A are continued to be wound on the main drive takeup reel, these sections continue to turn the pillow in a generally clockwise direction, as viewed in FIGS. 5 and 6, as the guide loops 67 will have been pulled into positions beneath the armpits of the occupant by the sections 60B and 61B which will partially wind on the main drive takeup reel; the lower end of the pillow being held by its attachment to the torso restraint element at the torso of the occupant. More particularly, referring to FIGS. 4 and 5, it will be seen that the guide loops 67 are still being held by the retracting wires 40 and 41 at locations forwardly of the axis of the restraint element 15 and forwardly of the occupant's arm when the restraint first abuts the chest of the occupant. As the cables 44 and 45 continue to wind onto a reel 150, the cables 44 and 45 pull the guide loops 67 rearwardly under the arms of the occupant and as the guide loops travel above (see FIG. 4) and pass the axis of the torso restraint element 15 the cable sections 60A and 61A pull the ends 65 upwardly past the axis of the head restraint causing the pillow to pivot up toward the face of the occupant (FIG. 6) with the cable sections 60A and 61A extending generally vertically down from now upper ends 65 to beneath the armpits of the occupant. Thus, the head restraint is held at the head of the occupant to limit its forward movement when the torso restraint element is also in position to hold the occupant in the seat. At this time, the heavy cable sections 44A and 45A are wound on the reel and take the heavy load applied by the occupant during his deceleration relative to the vehicle.

The knee restraint element 25 is, in this illustrated embodiment of the invention, in the form of a generally inverted U-shaped member 90 having a pair of spaced legs 91 pivotally connected as by hinges 93 to the floorboard 29 of the vehicle. Between these legs 91 is a crosspiece 95 which moves from a generally horizontal position flush with the floorboard in its stowed position, as seen in FIGS. 1 and 2, upwardly to abut the knees of the occupant, as shown in FIGS. 5 and 6. A suitable padding, such as a resilient pad on the crosspiece abuts the knees to prevent the occupant from submaring, i.e., sliding under the torso restraint element 15. The means for shifting the knee restraint 25 from its stowed to its operative position includes a pair of cables 100 and 101, which, as shown in FIGS. 2 and 6, extend upwardly through holes 103 from the underside of the crosspiece 95 from a pair of retractors 107 and 109, as best seen in FIG. 6, to ends connected to eyelets 69. The retractors 107 and 109 retract the cables 100 and 101 to the positions shown in FIG. 1 in which these cables have laterally extending portions between the holes 103 and the elongated grooves 113 and 114 in the floor rug or covering material. As in the aforementioned patent, a pair of large retractors 117 and 119 are fastened beneath the floor board at the forward ends of the elongated slots 113 and 114 and have cables 120 and 121 extending therefrom to the eyelets 69 to retract the eyelets through the grooves and onto the retractors 117 and 119 thereby positioning the cables in the position shown in FIG. 1.

Also, cables are preferably retracted into a pair of grooves 125 in seat bench 128 and into grooves 127 in the seat back 129 in the manner disclosed in the aforementioned patent. To retract the cables to lie in the fore and aft extending grooves 113 and 114, a pair of large retractors 130, FIG. 2, are disposed beneath floorboard 29 at a location adjacent the front edge of the seat bench and strands 131 wound thereon extend upwardly along the vertical groove in the forward end of the seat bench to a connection with the cables 70 and 71. When the strands 131 are retracted, the cables 70 and 71 lie in the grooves 113 and 114 between the forward retractors 117, 119 and the rearward retractors 130.

Also, in accordance with the system disclosed in U.S. Pat. No. 3,940,164, it is preferred to have further retractors 140 mounted in the seat with strands 114 connected to the cables 70 and 71 to retract the latter into the grooves 127 in the seat back 129 until such time as the restraint elements are shifted from their stowed positions. More specifically, to fully conceal the cables in the seat, it is preferred to have an additional retractor 140 and 141 located at the rear of the seat bench 128 and below the forward edge of the seat back 129 to hold portions of the cables 70 and 71 in the grooves 125 in the seat bench. The portions of the cables 70 and 71 in the grooves 127 in the seat back are kept taught therein by the retractors 140 and the main drive and takeup reel.

A brief description of operation will now be given to aid in understanding the invention. The restraint elements all are in stowed position with the cables 70 laying in the grooves 113, 114, 125 and 127 and extending between the main drive take-up reel 150 and the other cables and wires generally located under the dashboard as shown in FIG. 1. The take-up reel is preferably fast acting and to this end the drive means 149 for the reel 150 may take the form of a continuously running electric motor 152 connected by an electrical type of clutch 154 to the reel. With a continuously operating electric motor 152, the time lag for the motor to be energized and to overcome the inertia of its driving parts is eliminated. It is to be appreciated that the drive means 149 may take various forms such as a fast acting explosion actuator or cylinder mechanism to pull the cables quickly through the necessary distance to shift the restraint elements to their operative positions.

The switch mechanism 160 in the electrical circuit 161 may also take various forms including an inertia operated switch mechanism as disclosed in the aforementioned patent. Another alternative switch mechanism is to use a pressure operated switch connected to the hydraulic brake system so that when the occupant jams on the brakes the pressure build up in the braking system exceeds a predetermined pressure, the switch mechanism 160 closes in the circuit 161 causing the electrical clutch 154 to clutch the reel 150 and shift the cables generally to the position of FIG. 6.

As can be readily understood from the sequence of events shown in FIGS. 1-6, the cable means pulls the torso restraint element 15 tightly against the chest of the seat occupant. Generally speaking, the occupant will usually extend his hands to brace himself against the dashboard or will grab a hand-hold 165 (FIG. 1) on an arm rest 166 secured to the vehicle door. The driver will usually have his hands on the steering wheel. Preferably, at the driver's side, there is no shiftable knee restraint similar to the knee restraint 25 illustrated for the passenger's side herein.

In any event, with the torso restraint element 15 abutting the torso, as shown in FIG. 5, the head restrainst element 21 preferably continues to move upwardly pivoting about the axis of the torso restraint element because of its attachment thereto. The head restraint element is preferably a resilient pillow type member which engages the face of the occupant and cushions and absorbs energy as the occupant's face buries itself in the pillow. In the manner disclosed in the aforementioned patent, the drive motor means for the take-up reel means 150 is released either by operation of a manual switch to de-energize the clutch or the motor. Alternatively, a time delay mechanism may be used to automatically release the take-up reel to allow it to unwind the cables thereon due to the combined forces of the springs in each of the retractors. Once the take-up reel means is released, each of the retractors retracts its attached cable and rewinds the same. The retractors 117 and 119 have sufficient tension force to act through the cables 100 and 101 to pull the knee restraint element flat against the floorboard. The retractors 38 and 39 pull the head restraint element 21 and torso restraint element under the dashboard to the stowage position shown in FIG. 1.

The preferred head restraint element 21 does not interfere with the driver's or other occupant's vision as it is preferably constructed to abut the chin of the driver or seat occupant at its upper edge. That is, the eyes of the occupant are preferably not covered by the preferred head restraint 21 allowing the occupant to continue to control the vehicle when his chin is impacting the head restraint element 21. With very large force collisions or with very small persons, the head restraint element 21 may be impacted so as to cover more of the person's face than only his chin during the energy absorbing period.

The driver of the vehicle when observing the imminence of a crash with his vehicle will instinctively jam on the brakes causing a high pressure impulse to activate the drive means 149 prior to impact with another object. Thus, before impact, time is available to begin the shifting of the body, knee and head restraint elements.

From the foregoing, it will be seen that the present invention provides a restraint not only to the torso but also to the head and neck. Preferably, a knee restraint is also provided although it need not be used. The restraints, including the head restraint, may be used again and again without cost in this preferred embodiment of the invention.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A safety-belt system for a vehicle comprising a chest restraint element movable from a stowage position located adjacent the vehicle's dashboard to a restraint position about the vehicle's occupant's chest, cable means to shift the chest restraint element from the stowage position to the restraining position with the restraint element extending across the occupant's chest, power means for returning the chest restraint element from the restraining position to the stowage position after use for reuse, an electrically operated control means operable upon a predetermined deceleration of the vehicle to operate the shifting means to shift the chest restraint element automatically from the stowage position to the restraint position, a head restraint means movable from a stowage position located adjacent the vehicle's dashboard to a restraint position for restraining the occupant's head, said head restraint being connected to said chest restraint element and being movable therewith until said chest restraint engages said chest, said cable means having a portion thereof continuing to shift said head restraint element independently of said chest restraint element and upwardly and rearwardly toward the face of the occupant after said chest restraint element has engaged the occupant's chest, said cable means and said power means moving the head restraint means between its stowage position and its restraint position.

2. A safety restraint system in accordance with claim 1 including a leg restraint movable from a stowage position to a restraint position at an occupant's knees to restrain the legs and knees of the occupant.

3. A safety restraint system in accordance with claim 2 in which said means for moving said head restraint comprises a plurality of cables connected at one end to the head restaint and a plurality of retractor means connected to the other end of said cables for retracting said head restraint to its stowage position.

4. A safety restraint system in accordance with claim 1 in which said head restraint means comprises a cushioning pillow connected by cables to the means for moving said restraint element, said cables pivoting said pillow upwardly toward the occupant's head after said pillow hits the occupant's body.

5. A safety belt system in accordance with claim 1 in which said means for shifting said restraint element and means for shifting said head restraint comprise a cable system having first ends connected to the respective restraint elements and other ends connected to retractor means.

6. In combination with a vehicle having a front seat and a dashboard, a safety restraint system comprising an elongated safety chest restraint element stowed in a stowage position in front of the driver of the vehicle, a head restraint stowed in a stowage position in front of the driver of the vehicle, means connecting said head restraint to said chest restraint element along a longitudinally extending side of said chest restraint element and permitting said head restraint element to turn upwardly toward the occupant's face and relative to said chest restraint element when the latter has engaged the occupant's chest, recesses in said seat and in said floorboard, a cable means for shifting said restraint element and head restraint having cable portions thereof extending rearwardly and laterally of the sides of the driver and disposed in said recesses to be substantially hidden from view, means guiding said cable portions through recesses in said seat at the chest level of an occupant, a power means for taking up said cable portions and removing said chest restraint element and said head restraint from said head restraint from said stowage positions and pulling said chest restraint element about the chest of the driver on the front seat to restrain the driver against injury at the time of a collision, said cable means including means connected to said head restraint at locations spaced from said connecting means to turn said head restraint in an upwardly and rearwardly direction toward the occupant's face and relative to said chest restraint element and thereby positioning said head restraint in a position in the front of the driver's head, means for sensing an impact or acceleration or deceleration of the vehicle and for operating said power means to shift said belt to the restraining position.

* * * * *